(12) United States Patent
Sen et al.

(10) Patent No.: US 11,014,813 B2
(45) Date of Patent: May 25, 2021

(54) ROOM-TEMPERATURE FERROMAGNETIC-FERROELECTRIC MULTIFERROIC MATERIAL

(71) Applicant: Council of Scientific & Industrial Research, New Delhi (IN)

(72) Inventors: Mousumi Sen, Pune (IN); Pankaj Poddar, Pune (IN)

(73) Assignee: Council of Scientific & Industrial Research

( * ) Notice: Subject to any disclaimer, the term of this patent is extended or adjusted under 35 U.S.C. 154(b) by 507 days.

(21) Appl. No.: 15/777,016

(22) PCT Filed: Nov. 16, 2016

(86) PCT No.: PCT/IN2016/050402
§ 371 (c)(1),
(2) Date: May 17, 2018

(87) PCT Pub. No.: WO2017/085741
PCT Pub. Date: May 26, 2017

(65) Prior Publication Data
US 2019/0225493 A1    Jul. 25, 2019

(30) Foreign Application Priority Data

Nov. 17, 2015   (IN) .......................... 3743/DEL/2015

(51) Int. Cl.
| | | |
|---|---|---|
| *H01F 1/36* | (2006.01) | |
| *C09K 11/88* | (2006.01) | |
| *C01B 19/00* | (2006.01) | |
| *C04B 35/547* | (2006.01) | |
| *C04B 35/632* | (2006.01) | |

(52) U.S. Cl.
CPC .......... *C01B 19/007* (2013.01); *C04B 35/547* (2013.01); *C04B 35/6325* (2013.01); *H01F 1/36* (2013.01); *C01P 2002/52* (2013.01); *C01P 2004/16* (2013.01); *C01P 2004/64* (2013.01); *C01P 2006/42* (2013.01); *C04B 2235/3272* (2013.01); *C04B 2235/40* (2013.01); *C04B 2235/404* (2013.01); *C04B 2235/405* (2013.01); *C04B 2235/42* (2013.01); *C04B 2235/44* (2013.01)

(58) Field of Classification Search
CPC ......... H01F 1/36; C09K 11/88; C01B 19/007; C01P 2002/52; C01P 2004/16; C01P 2004/64; C01P 2006/42; B82Y 40/00
See application file for complete search history.

(56) References Cited

U.S. PATENT DOCUMENTS

| | | | | |
|---|---|---|---|---|
| 2,190,303 A | * | 2/1940 | Wantz .................. | H05B 1/0208 335/181 |
| 2014/0262810 A1 | * | 9/2014 | Rondinone ............... | C25B 1/00 205/478 |

OTHER PUBLICATIONS

P. Poddar, et al., "Ferromagnetic ordering in nanostructured Mn-doped InP", Applied Physics Letters 87, 062506 (2005), pp. 062506-1-062506-3.
Shao-Jie Li, et al., "High Curie temperature and coercivity performance of Fe3-xCrxSe4 nanostructures.", Nanoscale. Mar. 12, 2015; 7(12): 5395-402 (abstract only).
Mousumi Sen Bishwas, et al., "Large Increase in the Energy Product of Fe3Se4 by Fe-Site Doping", J. Phys. Chem. C, 2014, 118 (8), pp. 4016-4022 (abstract only).
D.I. Khomskii, "Multiferroics: Different ways to combine magnetism and ferroelectricity", Journal of Magnetism and Magnetic Materials 306 (2006), pp. 1-8.
Mandar M. Shirolkar, et al., "Observation of Enhanced Dielectric Coupling and Room-Temperature Ferromagnetism in Chemically Synthesized BiFeO3@ SiO2 Core-Shell Particles", J. Phys. Chem. C 2012, 116, pp. 19503-19511.
V.R. Palkar, et al., "Observation of magnetoelectric behavior at room temperature in Pb(FexTi1-x)O3", Solid State Communications 134 (2005), pp. 783-786.
G.B. Abduluev, et al., "physica status solidi (a) 20", Institute of Physics, Academy of Sciences of the Azerbaidzhan SSR, Baku; Aug. 9, 1973, pp. K29-K31.
Meiya Li, et al., "Room temperature ferroelectric, ferromagnetic and magnetoelectric properties of Ba-doped BiFeO3 thin films", J. Phys. D: Appl. Phys. 40 (2007), pp. 1603-1607.
Lynette Keeney, et al., "Room temperature ferroelectric and magnetic investigations and detailed phase analysis of Aurivillius phase Bi5Ti3Fe0.7Co0.3O15 thin films", Journal of Applied Physics 112, 052010 (2012); pp. 052010-1-052010-10.
I. S. Lyubutin, et al., "Structural, magnetic, and electronic properties of iron selenide Fe6-7Se8 nanoparticles obtained by thermal decomposition in high-temperature organic solvents", The Journal of Chemical Physics 141, 044704 (2014); pp. 044704-1-044704-11.
Karimat EL-Sayed, et al., "Structure, magnetic and dielectric properties of nanocrystalline Se-xFe", Superlattices and Microstructures 75 (2014), pp. 311-323.

(Continued)

*Primary Examiner* — Matthew E. Hoban
*Assistant Examiner* — Lynne Edmondson
(74) *Attorney, Agent, or Firm* — St. Onge Steward Johnston & Reens LLC

(57) ABSTRACT

A multiferroic material for magnetic and electric switching including Iron selenide (Fe$_3$Se$_4$) nanoparticles and its derivatives or doped with at least one element selected from transitional metals, rare earths elements or combination of the two and chalcogens. Ferroelectric polarization and coupling of magnetic and ferroelectric behavior in the doped Fe3Se4 is observed at a temperature ranging from 15 to 30° C.

5 Claims, 9 Drawing Sheets

(56) References Cited

OTHER PUBLICATIONS

Jun Wang, et al., "Temperature dependence of magnetic anisotropy constant in iron chalcogenide $Fe_3Se_4$: Excellent agreement with theories", Journal of Applied Physics 112, 103905 (2012) (abstract only).

* cited by examiner

ROOM-TEMPERATURE FERROMAGNETIC-FERROELECTRIC MULTIFERROIC MATERIAL

FIELD OF THE INVENTION

The present invention relates to room temperature multiferroicity and magnetoelectric effect in Iron Selenide ($Fe_3Se_4$) and several of its derivatives with various cation/anion dopings and grain morphology. More particularly, the present invention relates to a multiferroic material comprising $Fe_3Se_4$ nanoparticles and its derivatives, characterized in that the ferroelectric polarization in $Fe_3Se_4$ and coupling of magnetic and ferroelectric behavior is observed at room temperature.

BACKGROUND OF THE INVENTION

Ferroic properties such as magnetic and ferroelectric ordering and the development of electronic materials based on these properties permeate a broad range of technologies (defense, consumer electronics, space, energy and health care etc). The interest in finding materials with more than one ferroic properties coexisting at room temperature in a single-phase material is quite challenging. Such materials are termed as multiferroics. The existence of coupling between magnetic and ferroelectric ordering is termed as magnetoelectric coupling. In such a material, the application of an external magnetic field can generate or influence preexisting electrical polarization, whereas the applied electric field can influence the magnetic polarization. The multiferroic materials have a wide range of applications in information storage, satellite communications, microwave field, precision control, spin electronic devices, circuit measurement of high voltage transmission lines, magnetic sensors and capacitors—inductors integrated field-effect devices and other aspects. In addition, these materials also have great significance in terms of fundamental physics research. Currently, the multiferroic material has become a very important functional material, attracting the attention of materials scientists.

Multiferroics are the compounds, which contain two or more ferroic orders out of polarization, magnetization and elasticity in the same phase. The search for these compounds has engaged the research towards hundreds of materials containing rare-earth ferrites, manganites, chromites, nicklates and many more among the composite materials. However, for any technical applications of these materials, room temperature functionality and strong coupling with the ferroic order-parameters is crucial. The technical challenges associated with most of the compounds are following: very low magnetic transition temperature, small polarization values and week coupling between them. Lately, there were reports on the unconventional multiferroics where mechanisms were discussed for the origin of ferroelectricity in centrosymmetric materials based on charge ordering and bond ordering. A magnetoelectric is a generic name for the material, which exhibits significant mutual coupling between its magnetic and electronic properties. Especially important group in this category are multiferroics, which simultaneously demonstrate ferroelectricity and ferromagnetism. Although there exist few examples of single-phase multiferroics, the multiferroic composites with superior magnetoelectric parameters are much more attractive for applications. These composites consist of mechanically coupled ferroelectric and ferromagnetic phases. The conversion of magnetic to electric energy takes advantage of piezoelectric (or more general electrostrictive) properties of the ferroelectric phase and piezomagnetic (or magnetostrictive) properties of the ferromagnetic phase.

Recently, high temperature multiferroicity was predicted in $BaFe_2Se_3$ phase, which was quite unexpected. Later, it was shown experimentally with the help of photoemission spectroscopy that two kinds of electrons (localized and itinerant) coexist in $BaFe_2Se_3$ phase [*Phys. Rev. Lett.*, (2014), 113, 187204].

Article titled "Structural, magnetic, and electronic properties of iron selenide Fe6-7Se8 nanoparticles obtained by thermal decomposition in high-temperature organic solvents" by Lyubutin I S et al. published in *The Journal Of Chemical Physics*, 2014, 141(4):044704 reports iron selenide nanoparticles with the NiAs-like crystal structure synthesized by thermal decomposition of iron chloride and selenium powder in a high-temperature organic solvent. Depending on the time of the compound processing at 340° C., the nanocrystals with monoclinic (M)-Fe3Se4 or hexagonal (H)-Fe7Se8 structures as well as a mixture of these two phases was obtained. In addition, an unusual effect of "switching" of magnetization in a field of 10 kOe was found in the Fe3Se4 nanoparticles below 280 K, which can be important for applications.

Article titled "Observation of enhanced dielectric coupling and room-temperature ferromagnetism in chemically synthesized $BiFeO_3$@$SiO_2$ core-shell particles" by Mandar M. Shirolkar et al. published in *Journal of Physical Chemistry C*, 2012, 116 (36), pp 19503-19511 reports the effect of $SiO_2$ coating on the structural, magnetic, and dielectric properties of chemically synthesized high-purity $BiFeO_3$ particles. The as-synthesized $BiFeO_3$ particles demonstrate properties comparable with those reported for bulk $BiFeO_3$. On the other hand, the structural measurement on $BiFeO_3$@$SiO_2$ shows that the $SiO_2$ coating has anisotropically compressed the lattice of $BiFeO_3$ particles and stimulates the variation in the electron density. This affects magnetic and dielectric behaviour of material. Frequency-dependent dielectric constant study at low temperature (20-325 K) revealed slight reduction (8-10%) in the dielectric constant of $BiFeO_3$@$SiO_2$ particles compared to uncoated $BiFeO_3$ particles.

Article titled "Structure, magnetic and dielectric properties of nanocrystalline Se-xFe" by Karimat El-sayed et al. published in *Superlattices and Microstructures*, 2014, 75 (2014) 311-323 reports nanocrystalline Se-xFe (x=3 and 5 wt %) samples were prepared by solid state reaction. XRD revealed the presence of two phases; $FeSe_2$ and Se. HRTEM showed the epitaxial growth of $FeSe_2$ on Se. The magnetization measurements showed ferromagnetic behavior above room temperature for sample with x=5 wt %. The a. c conductivity for x=3 wt % follows the overlapping large polaron tunneling model, while for (x=5 wt %) sample it follows the correlated barrier hoping model. The temperature dependence of the dielectric measurements revealed an anomaly above room temperature for (x=5 wt %) sample, while it appeared at room temperature for (x=3 wt %) sample.

Article titled "Room temperature ferroelectric, ferromagnetic and magnetoelectric properties of Ba-doped $BiFeO_3$ thin films" by Meiya Li et al. published in *Journal of Physics D: Applied Physics*, Volume 40, Number 6 reports Ba-doped multiferroic $BiFeO_3$ thin films were successfully prepared on Pt/$TiO_2$/$SiO_2$/Si(100) substrates by pulsed laser deposition. X-ray diffraction showed that the $Bi_{0.75}Ba_{0.25}FeO_3$ thin film was single phase with (101) preferential polycrystalline orientation. Both ferroelectricity and ferromagnetism of these films were observed at room temperature by P-E and M-H loop measurements, respectively. The magnetoelectric coupling effect was demonstrated by measuring the dielectric constant in a varying magnetic field. The dielectric constants measured at 10 kHz increased with an increase in the applied magnetic field, giving a coupling coefficient ($\varepsilon r$ (H)−$\varepsilon r$ (0))/$\varepsilon r$ (0) of 1.1% at H=8 kOe at room temperature, which shows potential application.

Article titled "Room Temperature Nanoscale Ferroelectricity in Magnetoelectric GaFeO$_3$ Epitaxial Thin Films" by Somdutta Mukherjee et al. published in *Physical Review Letter*, 2013, 111, 087601 reports room temperature ferroelectricity in the epitaxial thin films of magnetoelectric gallium ferrite. Piezoforce measurements show a 180° phase shift of piezoresponse upon switching the electric field indicating nanoscale ferroelectricity in the thin films. Further, temperature-dependent impedance analysis with and without the presence of an external magnetic field clearly reveals a pronounced magnetodielectric effect across the magnetic transition temperature. In addition, our first principles calculations show that Fe ions are not only responsible for ferrimagnetism as observed earlier but also give rise to the observed ferroelectricity, making gallium ferrite a unique single phase multiferroic.

Article titled "Room temperature ferroelectric and magnetic investigations and detailed phase analysis of Aurivillius phase Bi$_5$Ti$_3$Fe$_{0.7}$Co$_{0.3}$O$_{15}$ thin films" by Keeney, Lynette et al. published in *Journal of Applied Physics*, v. 112(5); p. 052010-052010.10 reports Aurivillius phase Bi$_5$Ti$_3$Fe$_{0.7}$Co$_{0.3}$O$_{15}$ (BTF7C3O) thin films on α-quartz substrates were fabricated by a chemical solution deposition method and the room temperature ferroelectric and magnetic properties of this candidate multiferroic were compared with those of thin films of Mn3+ substituted, Bi$_5$Ti$_3$Fe$_{0.7}$Mn$_{0.3}$O$_{15}$ (BTF$_7$M$_3$O).

Article titled "Electrical properties of Fe$_7$Se$_8$, Fe$_3$Se$_4$, and NiFe$_2$Se$_4$ single crystals" by N. R. Akhmedov et al. published in *Physica Status Solidi* (a) 20(1) • November 1973 reports Electrical properties of Fe$_7$Se$_8$, Fe$_3$Se$_4$, and NiFe$_2$Se$_4$ single crystals.

Article titled, "Observation of magnetoelectric behavior at room temperature in Pb(Fe1-xTix)O$_3$" by V. R. Palkar in Materials Science reports the coexistence of ferroelectric and ferromagnetic properties at room temperature is very rarely observed. We have been successful in converting ferroelectric PbTiO$_3$ into a magnetoelectric material by partly substituting Fe at the Ti site. The Pb(Fe1-xTix)O$_3$ system exhibits ferroelectric and ferromagnetic ordering at room temperature. Even more remarkably, our results demonstrate a coupling between the two order parameters. Hence it could be a futuristic material to provide cost effective and simple path for designing novel electromagnetic devices.

Article titled "Large Increase in the Energy Product of Fe$_3$Se$_4$ by Fe-Site Doping" by Pankaj Poddar et al. published in *The Journal of Physical Chemistry*, C, 2014, 118, 4016-4022 reports synthesis of Fe$_3$-xMnxSe$_4$ (x=0.01-0.2) nanorods. As required for practical applications, after doping, the Curie temperature remains unchanged; however, at optimum (x=0.03) doping of manganese ions, the magnetization of the host matrix increases significantly from 4.84 to 7.54 emu/g. The corresponding energy product value was found to be increased by more than 130%. At low temperature (10 K) the energy product shows almost a 2 order of magnitude increase (~0.12 MG Oe), which makes it valuable for many low temperature applications. This improvement is a vital step for its use in some of the household applications where a large volume and relatively lower energy product are needed.

Article titled "Ferromagnetic ordering in nanostructured Mn-doped InP" by P. Poddar et al. published in *Applied Physics Letters*, 2005, 87, 062506 reports the observation of ferromagnetic ordering at 25 K in a diluted magnetic semiconductor DMS nanoparticle system: In0.9Mn0.1P, sized 3 nm. These particles were synthesized using a novel nanochemical technique without using any external surfactant. Structural and elemental characterizations established the occurrence of the zinc-blend phase of the DMS without any separate or induced impurity phase. A robust onset of ferromagnetic order is observed in magnetization measurements at around 25 K with blocked state behavior below 15 K characteristic of magnetic nanoparticles. The system shows strong frequency dependence of the susceptibility, similar to the behavior observed for spin glasses. Reversible transverse susceptibility experiments done using a resonant radio-frequency (rf) method reveal a strong temperature-dependent effective anisotropy.

Article titled "Multiferroics: different ways to combine magnetism and ferroelectricity" by D. I. Khomskii published in *Journal of Magnetism and Magnetic Materials* reports Multiferroics—materials which are simultaneously (ferro) magnetic and ferroelectric, and often also ferroelastic, attract now considerable attention, both because of the interesting physics involved and as they promise important practical applications. In this a survey of microscopic factors determining the coexistence of these properties, and discuss different possible routes to combine them in one material. In particular the role of the occupation of d-states in transition metal perovskites is discussed, possible role of spiral magnetic structures is stressed and the novel mechanism of ferroelectricity in magnetic systems due to combination of site-centered and bond-centered charge ordering is presented. Microscopic nature of multiferroic behaviour in several particular materials, including magnetite Fe$_3$O$_4$, is discussed.

In recent years, iron selenide Fe—Se compounds have attracted a great deal of interest because of promising application in peculiar electronic, optical, and magnetic devices. Room temperature multiferroic materials are technologically promising because of their applications in high-density memory storage, sensors and actuators. Till now, only very few materials show these properties at room temperature and the properties are very weak in nature. The Fe$_3$Se$_4$ has also gained attention quite recently because of its high uniaxial magnetic anisotropy constant without the presence of any rare earth metal or noble metal atom leading to very high coercivity at room temperature (~4 kOe).

There are only 32 space groups, which show spontaneous and reversible polarization, i.e ferroelectricity. At room temperature, the coexistence of both ferroelectric and magnetic polarization in a single-phase material is scarcer. Fe$_3$Se$_4$ is ferrimagnetic at room temperature with Curie temperature 323 K. But there is no report in literature about the dielectric properties of this material till date. Therefore, the research and development of new multiferroic materials have great significance in theory and practical application.

The main object of the present invention is to provide a multiferroic material comprising Fe$_3$Se$_4$ nanoparticles and its various derivatives characterized in that ferroelectric polarization in Fe$_3$Se$_4$ and coupling of magnetic and ferroelectric behavior is observed at room temperature.

Another object of the present invention is to provide a multiferroic material comprising Fe$_3$Se$_4$ nanoparticles doped with at least one element selected from transitional metals, rare earths elements and chalcogens.

Yet another object of the present invention is to provide use of iron selenide alone or doped with at least one element selected from transitional metal, rare earths and chalcogens for magnetic and electric switching at room temperature.

SUMMARY OF THE INVENTION

Accordingly, the present invention provides a multiferroic material for magnetic and electric switching. comprising $Fe_3Se_4$ or its derivatives wherein the $Fe_3Se_4$ or its derivatives optionally or doped with at least one element selected from the group consisting of transitional metals, rare earths elements, chalcogens or combinations thereof, characterized characterized in that ferroelectric polarization in $Fe_3Se_4$ and coupling of magnetic and ferroelectric behavior is observed at room temperature.

In preferred embodiment, said material is in the form of nanoparticles, nanorods, thin film or bulk.

In an embodiment, the present invention provides a multiferroic material comprising $Fe_3Se_4$ nanoparticles doped with at least one element selected from transitional metals, rare earths elements for the Fe-site and chalcogens at Se-site.

In preferred embodiment, the transitional metals, rare earths elements are selected from Cr, Co, Mn, V, Gd, Dy and chalcogens are selected from S, Te and the like.

In another embodiment, the present invention provides application of iron selenide alone or doped with at least one element selected from transitional metal, rare earths or combination of the two, and chalcogens for magnetic and electric switching at room temperature.

In another embodiment the present invention provides a process for the preparation of multiferroic material $Fe_3Se_4$ or its derivatives comprising steps of:

i) charging iron acetylacetonate and Se powder in a solvent under inert atmosphere to obtain a mixture;
ii) optionally charging in to the above mixture, transition elements, rare earth elements and/or chalcogens;
iii) heating the said mixture for 1-4 hour at a temperature in the range of 120-300° C.;
iv) cooling to room temperature naturally;
v) precipitating the product by addition of alcohol;
vi) washing the product with a mixture of hexane and 2-propanol to obtain the doped or undoped $Fe_3Se_4$ or its derivatives.

In another embodiment the alcohol is 2-propanol.

DETAILED DESCRIPTION OF THE INVENTION

The invention will now be described in detail in connection with certain preferred and optional embodiments, so that various aspects thereof may be more fully understood and appreciated.

Room temperature is the terminology used in this document for temperature in the range of 15-30° C.

In the view of above, the present invention provides a multiferroic material comprising $Fe_3Se_4$ nanoparticles characterized in that ferroelectric polarization in $Fe_3Se_4$ and coupling of magnetic and ferroelectric behavior is observed at room temperature.

In preferred embodiment, said material is in the form of nanoparticles, nanorods, thin film or bulk.

The present invention provides a very novel and unexpected phenomenon of observing spontaneous and reversible ferroelectric polarization in monoclinic iron selenide $Fe_3Se_4$. The spin-charge-phonon coupling is probed by dielectric impedance spectroscopy and Raman scattering experiment in the vicinity of magnetic transition temperature. The P-E hysteresis loop measurement at different temperature in a broad frequency range confirms the existence of spontaneous reversible polarization in this material. Thus $Fe_3Se_4$ may be termed as magnetoelectric multiferroic at room temperature. The dielectric spectroscopy of $Fe_3Se_4$ shows a clear anomaly around magnetic phase transition ($T_c$).

Figure 4:
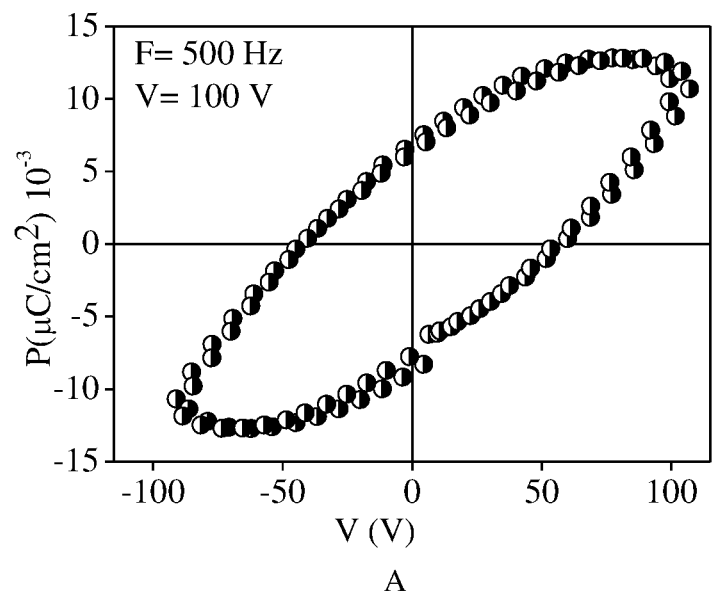
FIG. 4: Ferroelectric polarization loop of $Fe_3Se_4$ nanoparticles at frequency 500 Hz and 100 V applied voltage (top panel). The frequency dependence of the loop taken at frequency 100, 200 and 500 Hz (bottom panel).
Figure 4:
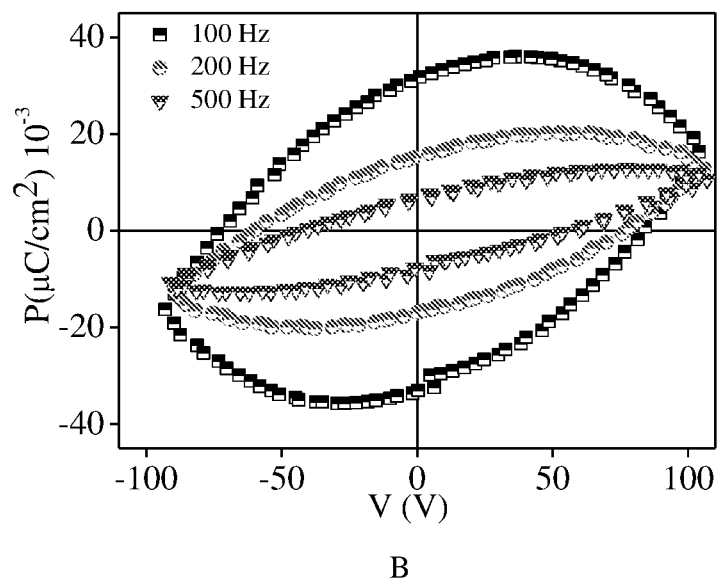
Figure 5:
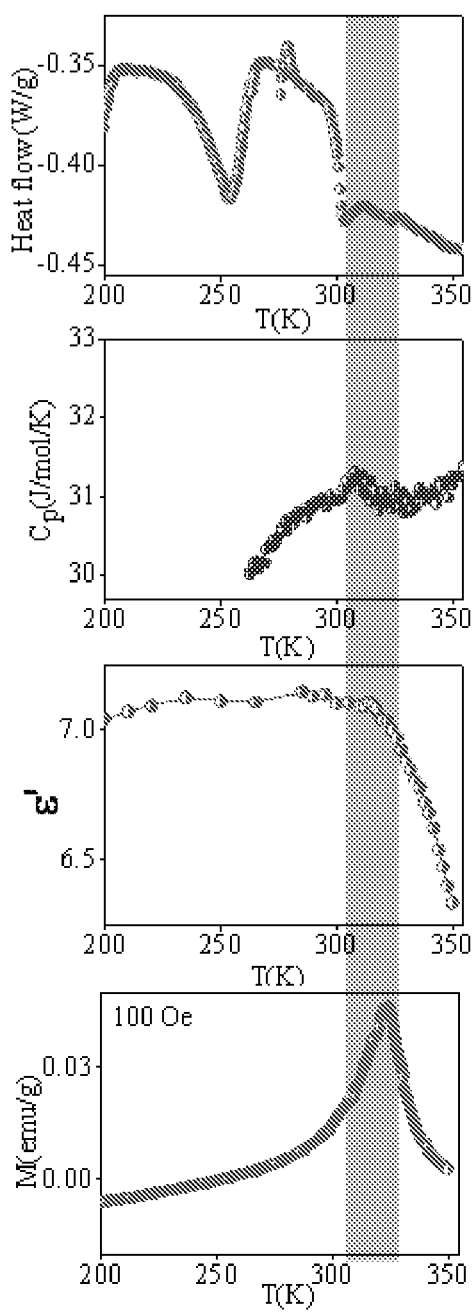
FIG. 5: The plot of differential heat flow in TGA, specific heat capacity, dielectric permittivity and magnetization with temperature. All these parameters show a clear anomaly at around 317 K indicating towards spin-phonon-charge coupling.

The invention further provides nanorods of monoclinic iron selenide ($Fe_3Se_4$) grown by high temperature thermal decomposition in organic solvents, with average diameter ~50 nm. X-ray diffraction pattern showed that nanorods are monoclinic in structure with space group C2/m. Temperature dependence of magnetization shows the transition temperature around 323 K below which it goes into a ferrimagnetic phase. Ferroelectric hysteresis measurements at room temperature (~298 K) shows closed loops in a broad frequency range. P-E loop taken with frequency 500 Hz and at potential 100 V is shown in FIG. 4.

The invention provides observation of ferroelectric order in $Fe_3Se_4$ nanoparticles at room temperature. These particles also show signatures of spin-charge coupling as an anomaly is observed in dielectric permittivity around magnetic transition temperature 323 K. Also, strong dependence of intensity of Raman spectra on external magnetic field indicates towards the presence of spin-phonon-charge coupling in the system. Ferroelectric polarization measurements revealed hysteresis loops in a broad frequency range. The microscopic origin of the coupling between spin-charge-phonon is not clearly understood. Vigorous theoretical calculations are required to probe this mechanism in this compound. It is observed that the coexistence of both magnetic and charge ordering at room temperature proposes $Fe_3Se_4$ as a possible room temperature multiferroic compound.

Figure 1:
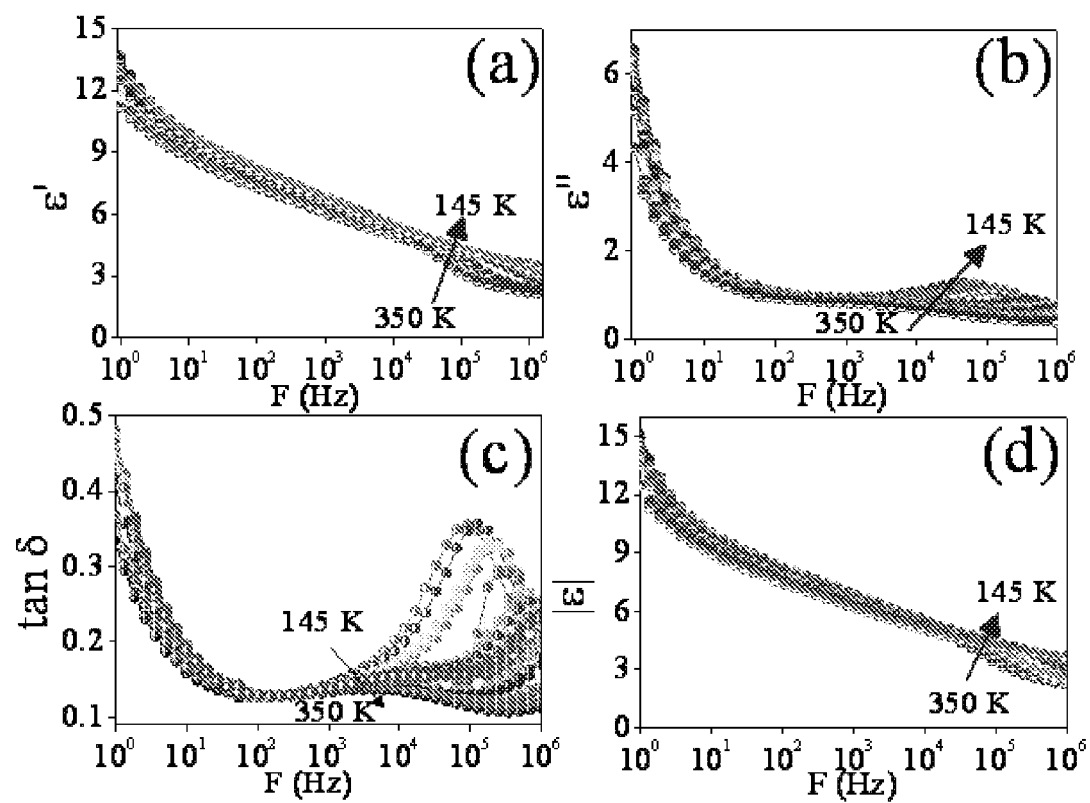
FIG. 1: Frequency dependence of (a) real part of permittivity (b) out of phase part of permittivity (c) loss factor (d) absolute permittivity measured with ac 1 V rms value at a temperature range from 200 K to 350 K.
Figure 2:
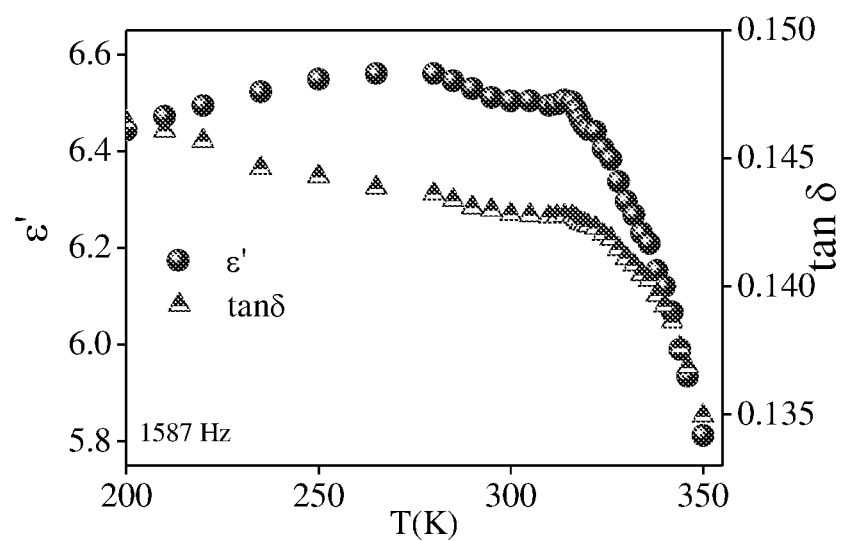
FIG. 2: Temperature dependence of real part of permittivity and loss tangent at frequency 1587 Hz. An anomaly can be seen (encircled) in ε' around 317 K which is in close proximity of magnetic transition temperature.

The dielectric response from the sample is measured in a frequency range 1 Hz to $10^6$ Hz spanning temperature range 150 K to 350 K at 1 V rms. The frequency dependence of various parameters is plotted as a function of frequency in FIG. 1. An anomaly is observed around temperature 317 K in both the real and imaginary part of c verses temperature curve plotted for a broad range of frequency. Above 317 K the value of c decreases sharply indicative of a ferroelectric to paraelectric transition.

Figure 3:
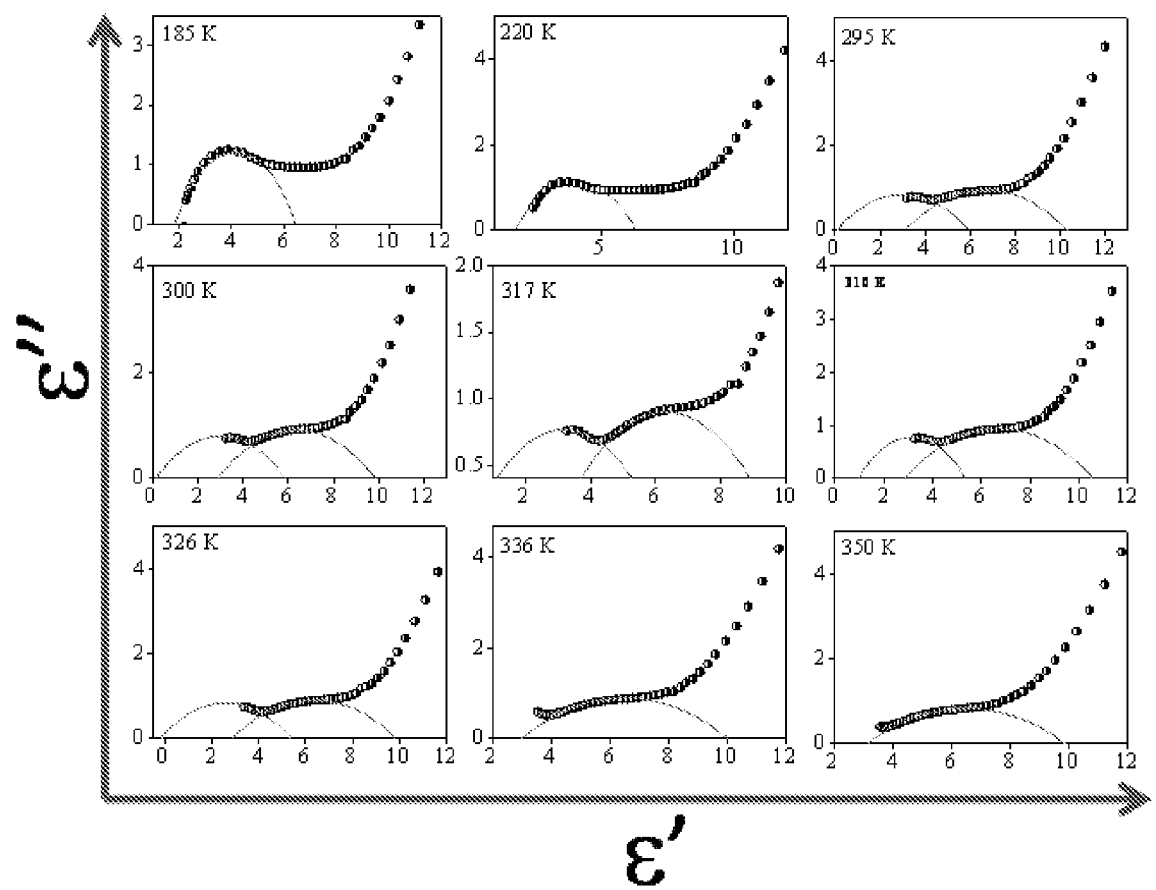
FIG. 3: Cole-Cole plot of as synthesized $Fe_3Se_4$ nanoparticles (ε" versus ε') measured by impedance spectroscopy at temperatures 185, 220, 295, 300, 317, 310, 326, 336 and 350 K respectively.

In order to understand the nature of dielectric relaxation in these nanorods, complex Argand plane plot ε" and ε', also known as Cole-Cole plot, is examined. FIG. 3 shows the plots between the real permittivity (ε') and imaginary permittivity (ε") part of the impedance at different temperatures. It is observed from the Cole-Cole plot that the center of the semicircle arcs are below the x-axis implying that the electrical response from the sample departs from the ideal Debye's relaxation process. Cole-Cole plots at various temperatures are given in figure. As can be inferred from the figure at very low temperatures (plots at 185 K, 220 K) there is only one semicircle which comes from the contribution from the grains. As the temperature increases and approaches near the Curie temperature another semicircle appears at lower frequency region associated with the contribution from the grain boundary. At Curie temperature both the contributions from grain and grain boundary is prominent but when the temperature is raised much above (plots at 336 K and 350 K), only the contributions due to grain boundary is prominent.

Figure 6:
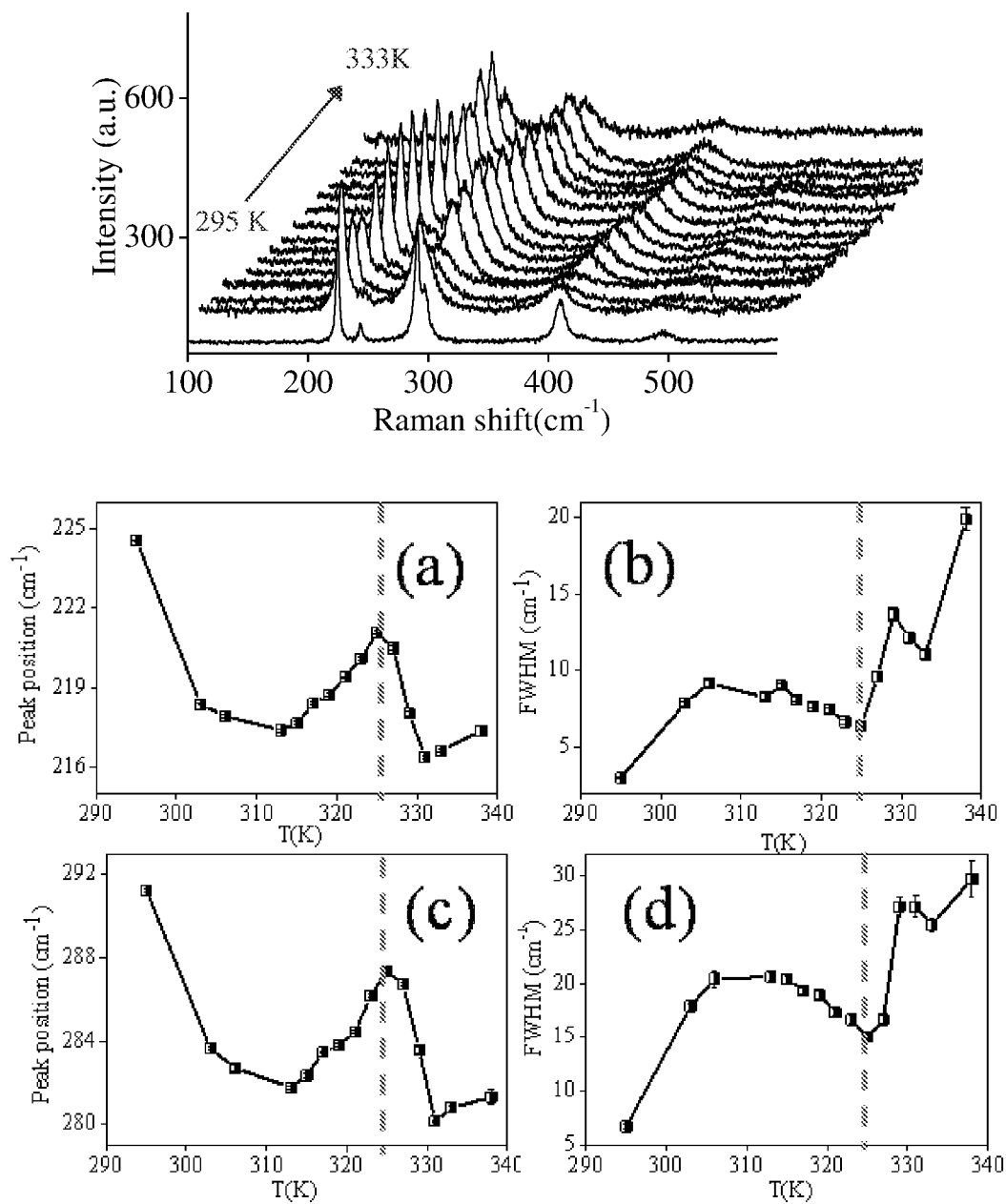
FIG. 6: Temperature dependence of Raman scattered signal from $Fe_3Se_4$ nanoparticles recorded from temperature 295 K to 333 K (top panel). The peak position and FWHM of two Raman modes are deduced from these plots and plotted against temperatures (Bottom panel). (a) and (b) shows the variation for 224 $cm^{-1}$ mode and (c) and (d) shows the variation for 291 $cm^{-1}$ mode.

FIG. 6 shows the Raman spectrums of as prepared $Fe_3Se_4$ nanoparticles taken at temperatures from 295 K to 333 K. The spectrum consists of sharp peaks at 224, 291, 409 $cm^{-1}$. The peak at 224 and 291 $cm^{-1}$ can be ascribed to the Fe—Se vibration modes as it is close to the reported values of 220 and 285 $cm^{-1}$ for the Fe—Se vibration in $\beta$-$Fe_7Se_8$ having similar monoclinic structure.

Figure 7:
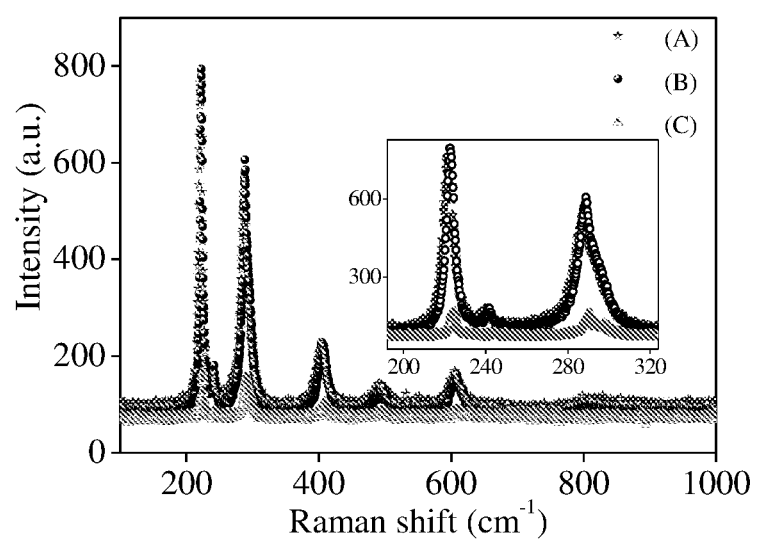
FIG. 7: Effect of external magnetic field on the Raman mode intensity is shown. (A) shows the Raman scattering signal without exposure. (B) Raman scattering signal with exposure to 100 Oe (Oersted) external magnetic field. (C) Raman scattering signal after the removal of magnetic field.

As the temperature is increased, the peaks, 224, 291 $cm^{-1}$, show significant change in the peak position and peak width (FWHM). When the peak position and FWHM is plotted with temperature, a clear incongruity is seen around the magnetic/ferroelectric transition temperature (~323 K) (FIG. 6). From the figure, it is appreciated that both the Raman modes softens as temperature is increased from 295 K. As the temperature further reaches the magnetic/ferroelectric ordering temperature the Raman mode starts hardening and peak shifts towards higher wavenumber and then immediately after transition temperature decreases sharply towards lower wavenumber. This anomaly in Raman modes observed near magnetic transition temperature provided a significant input indicating spin-phonon coupling in the system. This kind of anomaly near the magnetic transition temperature has been observed previously in case of pure selenium element. The effect of external magnetic field on these Raman modes is also studied. At room temperature, (which is close to the magnetic transition temperature) even a very small external magnetic field (0.01 T) distorts the spectra significantly and intensity of Raman modes decreases sharply (FIG. 7).

The earlier results in $Fe_3Se_4$ by single crystals (*phys. stat. sol.* (a) 20, K29 1973) show that for beyond magnetic ordering temperature the interatomic spacing rearranges such that the cation-cation overlapping disappears partially or completely. This may be the reason behind the anomaly in Raman modes near transition temperature.

In one embodiment, the present invention provides a multiferroic material comprising $Fe_3Se_4$ nanoparticles doped with at least one element selected from transitional metals, rare earths elements and chalcogens.

In preferred embodiment, the Fe site is doped with transition metal elements and rare earth elements. More preferably, the Fe site is doped with transition metal elements, rare earth elements selected from Cr (Chromium), Co (Cobalt), Mn (Manganese), V (Vanadium), Gd (Gadolinium), Dy (Dysprosium) and the like.

In another preferred embodiment, the anion site (Se) is doped with chalcogens. More preferably, the anion site (Se) is doped with chalcogens selected from S (Sulfur), Te (Tellurium).

Figure 8:
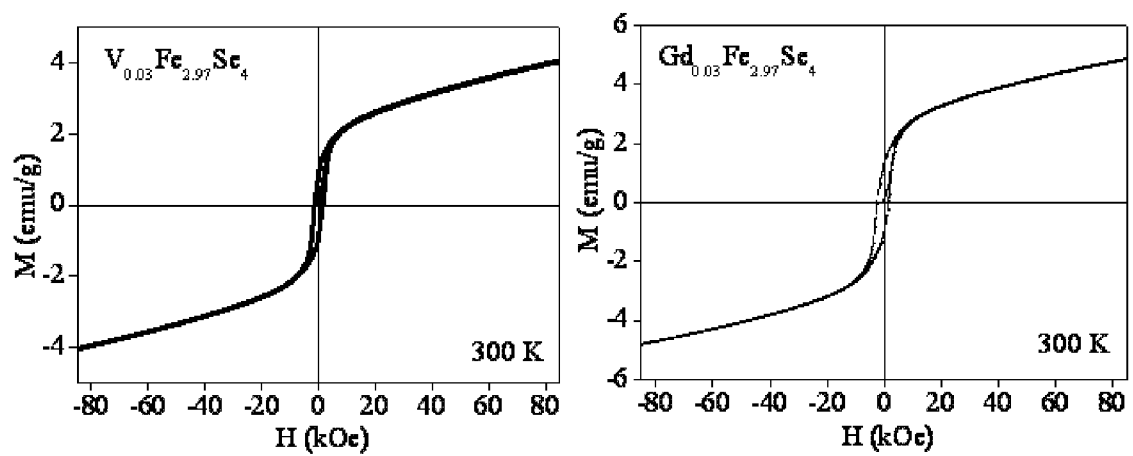
FIG. 8: M-H hysteresis loop of V and Gd doped samples showing ferrimagnetic nature at room temperature.
Figure 9:
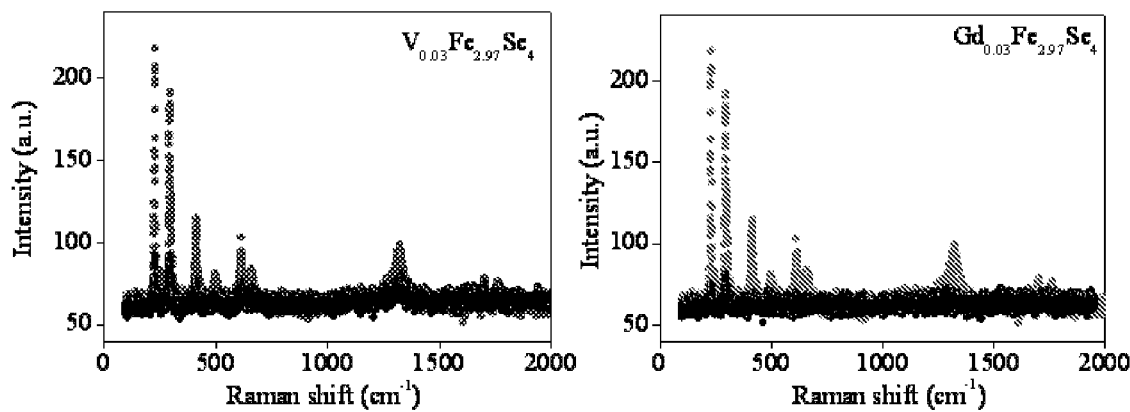
FIG. 9: Effect of external magnetic field on the Raman mode intensity is shown for two doped samples (V and Gd). Black data points shows the Raman scattering signal with exposure to 100 Oe external magnetic field. This indicates towards the presence of spin-phonon coupling in the system.

The results also show the coexistence of magnetization and ferroelectric polarization in doped samples. All the doped samples give ferrimagnetic nature in the magnetization hysteresis measurements at room temperature (FIG. 8). Also, the spin-phonon coupling is observed in doped samples similar to the pristine sample of $Fe_3Se_4$. When an external magnetic field is applied, the intensity of Raman modes decreases to a great extent (FIG. 9).

In another embodiment, the present invention provides use of iron selenide alone or doped with at least one element selected from transitional metal, rare earths and chalcogens for magnetic and electric switching at room temperature.

The following examples, which include preferred embodiments, will serve to illustrate the practice of this invention, it being understood that the particulars shown are by way of example and for purpose of illustrative discussion of preferred embodiments of the invention.

Following examples are given by way of illustration therefore should not be construed to limit the scope of the invention.

EXAMPLE

Magnetization measurements were done using the VSM attachment of PPMS from Quantum design systems equipped with 9 T superconducting magnet. Ferroelectric hysteresis loop measurements were done on pellets made by cold pressing the sample powder in zero field. Temperature dependent dielectric spectroscopy was performed using Novocontrol Beta NB Impedence Analyzer with a home-built sample holder to couple with a helium closed-cycle-refrigerator (Janis Inc.). The powdered sample was compressed in the form of circular pellet of diameter 13 mm and a custom designed sample holder was used to form parallel plate capacitor geometry.

Example 1

Synthesis of $Fe_3Se_4$ Nanoparticles

Iron acetyl acetonate $Fe(acac)_3$ (0.53 g, 1.5 mmol) and Se powder (0.158 g, 2 mmol) were added to 15 ml of oleylamine in a 100 ml three-neck flask under $N_2$ atmosphere. The mixture was heated to 120° C. and kept for 1 h. Then, temperature was increased up to 200° C. and kept for 1 h. Finally, the solution temperature was raised to 300° C. and kept for 1 h. After 1 h, the heat source was removed and solution was allowed to cool down naturally to room temperature. The $Fe_3Se_4$ nanoparticles were precipitated by the addition of 20 ml of 2-propanol. The precipitate was then centrifuged and washed with solution containing hexane and 2-propanol in 3:2 ratio.

Example 2

Synthesis of Doped Sample

To observe the effect of anion and cation site doping on the properties of $Fe_3Se_4$, few samples were prepared. The Fe site was doped with transition metal elements (Cr, Co, Mn, V) and rare earth elements (Gd, Dy). Similarly the anion site (Se) was doped with other chalcogens (S, Te). The samples were synthesized by taking stoichiometric amount of all the precursors at the beginning of the reaction.

Some of the advantages of the invention include that invention reports for the first time, the presence of spontaneous and reversible ferroelectric polarization in $Fe_3Se_4$ and their various derivatives (various cation/anion dopings and morphology) and coupling of magnetic and ferroelectric behavior at room temperature. These compound are relatively cheap and usually rare-earth free which is an added advantage for a multiferroic material. The simple crystal structure of this compound is an added advantage. Due to the presence of magnetoelectric coupling in $Fe_3Se_4$, the said material may find application in data storage, four state memory devices, magnetoelectric switching, spin valves, spintronics, catalytic activity, sensing devices, gas sensing etc, transducers and pyroelectric devices.

We claim:

1. A multiferroic material consisting of doped Fe3Se4, wherein the Fe3Se4 is doped with at least one element selected from the group consisting of Vanadium, Gadolinium, Dysprosium, and chalcogens selected from Sulfur and Tellurium, or combinations thereof, wherein ferroelectric polarization and coupling of magnetic and ferroelectric behavior in the doped Fe3Se4 is observed at a temperature ranging from 15 to 30° C.

2. The material according to claim 1, wherein the doped Fe3Se4 is in form of nanoparticles, nanorods, thin film or bulk.

3. The material according to claim 1 for use in magnetic and electric switching.

4. A process for the preparation of multiferroic material, the multiferroic material consisting of Fe3Se4 doped with at least one element selected from the group consisting of Vanadium, Gadolinium, Dysprosium, and chalcogens, or combinations thereof, the process comprising the steps of:
   i) charging iron acetylacetonate and Selenium powder in a solvent under inert atmosphere to obtain a mixture;
   ii) charging into the mixture of step i), at least one element selected from the group consisting of Vanadium, Gadolinium, Dysprosium, and chalcogens selected from Sulfur and Tellurium, or combinations thereof, to obtain a charged mixture;
   iii) heating the charged mixture as obtained in step ii) for 1-4 hours at a temperature in the range of 120–300° C. to obtain a heated mixture;
   iv) cooling the heated mixture of step iii) to room temperature naturally to obtain cooled mixture;
   v) precipitating product from the cooled mixture of step (iv) by addition of alcohol;
   vi) washing the product with a mixture of hexane and 2-propanol to obtain doped Fe3Se4.

5. The process according to claim 4, wherein the alcohol is 2-propanol.

* * * * *